US011824695B2

United States Patent
Valaee et al.

(10) Patent No.: US 11,824,695 B2
(45) Date of Patent: Nov. 21, 2023

(54) TIMER-BASED EDGE-BOOSTING EQUALIZER FOR HIGH-SPEED WIRELINE TRANSMITTERS

(71) Applicant: QUALCOMM Incorporated, San Diego, CA (US)

(72) Inventors: Darius Valaee, San Diego, CA (US); Patrick Isakanian, El Dorado Hills, CA (US); Srivatsan Thiruvengadam, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 78 days.

(21) Appl. No.: 17/579,405

(22) Filed: Jan. 19, 2022

(65) Prior Publication Data

US 2023/0275792 A1    Aug. 31, 2023

(51) Int. Cl.
*H04L 27/01* (2006.01)
*H04L 25/06* (2006.01)
*H04L 25/03* (2006.01)

(52) U.S. Cl.
CPC ........ *H04L 27/01* (2013.01); *H04L 25/03343* (2013.01); *H04L 25/069* (2013.01)

(58) Field of Classification Search
CPC .. H04L 27/01; H04L 25/03343; H04L 25/069
USPC ........................................................ 375/232
See application file for complete search history.

(56) References Cited

U.S. PATENT DOCUMENTS

2013/0033290 A1   2/2013 King
2019/0349226 A1*  11/2019 Chong .............. H04L 25/03343

OTHER PUBLICATIONS

Partial International Search Report—PCT/US2022/052715—ISA/EPO—dated Mar. 15, 2023.
International Search Report and Written Opinion—PCT/US2022/052715—ISA/EPO—dated May 22, 2023.
Wang X., et al., "A Hybrid Line Driver with Voltage-Mode SST Pre-Emphasis and Current-Mode Equalization", 2020 IEEE 63rd International Midwest Symposium on Circuits and Systems (MWSCAS), IEEE, Aug. 9, 2020, pp. 750-753, XP033819168, Section II, Figure 3.

\* cited by examiner

*Primary Examiner* — Leila Malek
(74) *Attorney, Agent, or Firm* — Loza & Loza, LLP

(57) ABSTRACT

An equalizing transmitter coupled to a serial transmission line has a driver circuit coupled between an input signal and the serial transmission line, the driver circuit being configured to receive power at a first voltage level. The equalizing transmitter has one or more helper circuits, each helper circuit being configured to receive a control signal and to pull the serial transmission line to a second voltage level when a pulse is present in the control signal. The second voltage level may be greater than the first voltage level. The equalizing transmitter has one or more pulse generation circuits, each pulse generation circuit being configured to receive the input signal and a delayed version of the input signal and to provide the pulse in the control signal when a difference in voltage state is detected between the input signal and the delayed version of the input signal.

30 Claims, 9 Drawing Sheets

TIMER-BASED EDGE-BOOSTING EQUALIZER FOR HIGH-SPEED WIRELINE TRANSMITTERS

TECHNICAL FIELD

The present disclosure generally relates to equalization on high-speed interfaces and, more particularly, to equalization circuits provided in a transmitter.

BACKGROUND

Electronic device technologies have seen explosive growth over the past several years. For example, growth of cellular and wireless communication technologies has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever. Wireless devices may include a high-speed bus interface for communication of signals between hardware components.

High-speed serial buses offer advantages over parallel communication links when, for example, there is demand for reduced power consumption and smaller footprints in integrated circuit (IC) devices. In a serial interface, data is converted from parallel words to a serial stream of bits using a serializer and is converted back to parallel words at the receiver using a deserializer. For example, the high-speed bus interface may be implemented using a Peripheral Component Interconnect Express (PCIe) bus, Universal Serial Bus (USB) or Serial Advanced Technology Attachment (SATA), among others.

IC devices may include a serializer/deserializer (SERDES) to transmit and receive through a serial communication link. In high-speed applications, timing of the operation of a SERDES may be controlled by one or more clock signals. Data rates supported or available on a serial data link may be limited by interference, noise, reflections and other characteristics of the communication channel provided by the serial data link. Performance, accuracy or reliability of the SERDES may depend on the availability of equalizing circuits that can reduce errors in received data due to channel imperfections. Conventional systems often use equalizers that are complex, occupy large areas within an IC device and that can consume excessive power. There is an ongoing need for new and efficient equalizers for high-speed serial links.

SUMMARY

Certain aspects of the disclosure relate to systems, apparatus, methods and techniques that can be used in equalizing circuits in a transmitter coupled to a serial data link. Certain aspects provide flexible configuration of equalizing circuits to enable different modes of operation. The modes of operation can include high frequency, high data rate operation and low-power modes that can be configured through control of clock signals used to sample data from the serial data link.

In various aspects of the disclosure, an equalizing transmitter coupled to a serial transmission line includes a driver circuit coupled between an input signal and the serial transmission line, the driver circuit being configured to receive power at a first voltage level. The equalizing transmitter includes one or more helper circuits, each helper circuit being configured to receive a control signal and to pull the serial transmission line to a second voltage level when a pulse is present in the control signal, the second voltage level being greater than the first voltage level. The equalizing transmitter includes one or more pulse generation circuits, each pulse generation circuit being configured to receive the input signal and a delayed version of the input signal and to provide the pulse in the control signal when a difference in voltage state is detected between the input signal and the delayed version of the input signal.

In various aspects of the disclosure, an apparatus includes means for transmitting a data signal over a serial transmission line, including a driver circuit operated at a first voltage level and configured to drive the serial transmission line in accordance with an input signal; means for generating pulses, configured to provide a control signal representative of a voltage difference between the input signal with a delayed version of the input signal; and means for boosting the data signal including one or more helper circuits configured to pull the serial transmission line to a second voltage level when a pulse is present in the control signal, the second voltage level being greater than the first voltage level.

In various aspects of the disclosure, a method for equalizing a data signal transmitted over a serial transmission line includes driving the serial transmission line to a first voltage level in response to an input signal received by a driver circuit, providing a pulse in a control signal when a difference in voltage state is detected between the input signal and the delayed version of the input signal, and pulling the serial transmission line to a second voltage level when the pulse is present in the control signal, the second voltage level being greater than the first voltage level.

In certain aspects, a delay circuit may be configured to provide the delayed version of the input signal by applying a delay to the input signal. A multibit delay select signal may be used to select a delay to be applied to the input signal in order to provide the delayed version of the input signal.

In certain aspects, each of the one or more helper circuits reduces an impedance presented to the serial transmission line when the pulse is present in the control signal. In one example, the one or more helper circuits are configured to source or sink different levels of currents through the serial transmission line when the pulse is present in the control signal. Each helper circuit has a gating circuit responsive to a corresponding enable signal that is indicative of a bit in an equalization code. The gating circuit may enable its associated helper circuit to pull the serial transmission line to the second voltage level when turned on by the corresponding enable signal. A value of the equalization code configures an amplitude of an equalization current that flows through the serial transmission line when the pulse is present in the control signal.

In certain aspects, the driver circuit is coupled to the output of the integrated circuit device using NMOS transistors. The one or more helper circuits may be coupled to the serial transmission line using PMOS transistors. The one or more helper circuits may be coupled to the serial transmission line using thick-oxide PMOS transistors. In one aspect, the driver circuit can be coupled to the serial transmission line using a combination of NMOS transistors and PMOS transistors.

DETAILED DESCRIPTION

Figure 1:
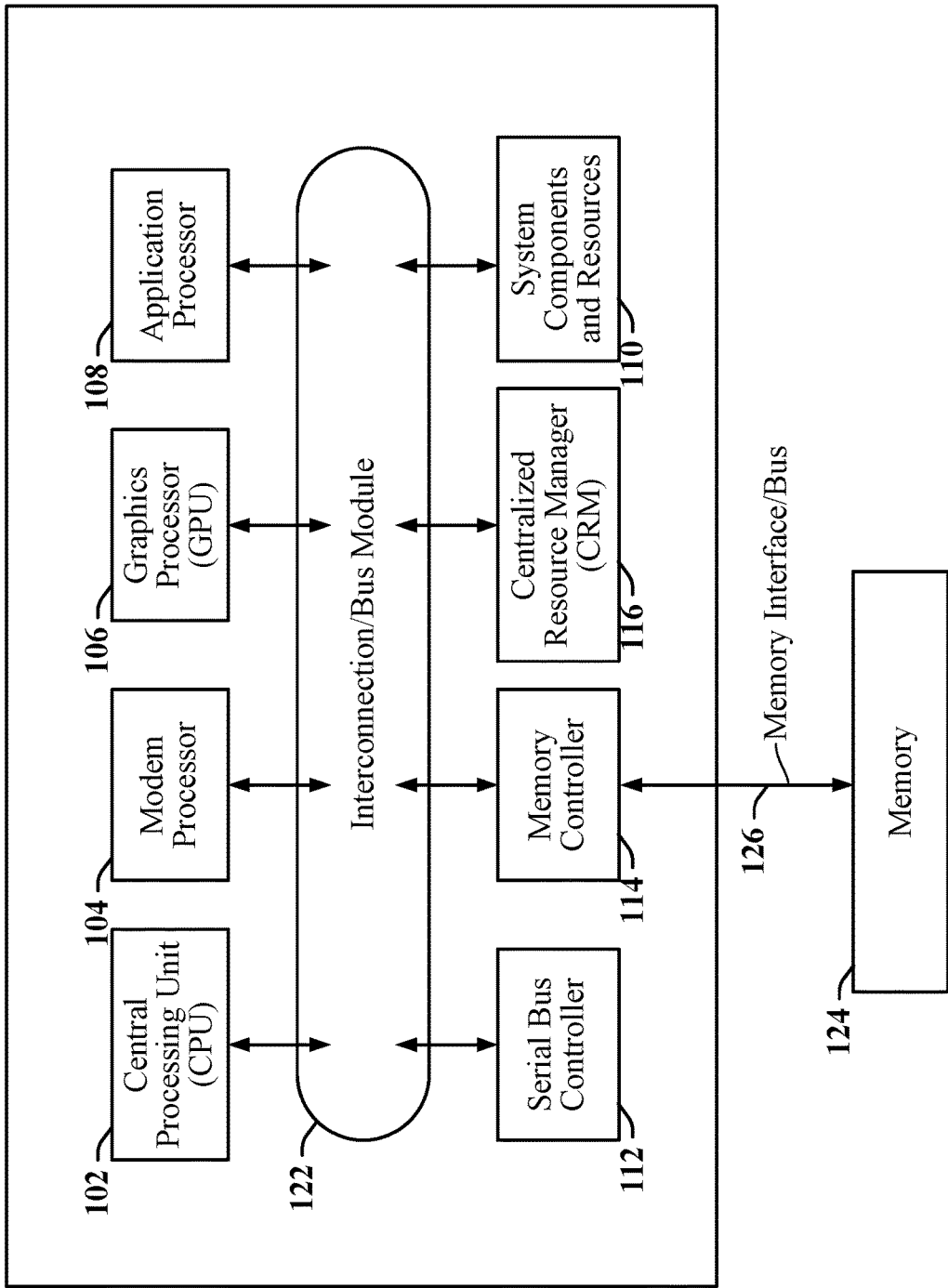
FIG. 1 illustrates an example of a system-on-a-chip (SOC) in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

With reference now to the Figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

The terms "computing device" and "mobile device" are used interchangeably herein to refer to any one or all of servers, personal computers, smartphones, cellular telephones, tablet computers, laptop computers, notebooks, ultrabooks, palm-top computers, personal data assistants (PDAs), wireless electronic mail receivers, multimedia Internet-enabled cellular telephones, Global Positioning System (GPS) receivers, wireless gaming controllers, and similar personal electronic devices which include a programmable processor. While the various aspects are particularly useful in mobile devices (e.g., smartphones, laptop computers, etc.), which have limited resources (e.g., processing power, battery, size, etc.), the aspects are generally useful in any computing device that may benefit from improved processor performance and reduced energy consumption.

The term "multicore processor" is used herein to refer to a single integrated circuit (IC) chip or chip package that contains two or more independent processing units or cores (e.g., CPU cores, etc.) configured to read and execute program instructions. The term "multiprocessor" is used herein to refer to a system or device that includes two or more processing units configured to read and execute program instructions.

The term "system on chip" (SoC) is used herein to refer to a single integrated circuit (IC) chip that contains multiple resources and/or processors integrated on a single substrate. A single SoC may contain circuitry for digital, analog, mixed-signal, and radio-frequency functions. A single SoC may also include any number of general purpose and/or specialized processors (digital signal processors (DSPs), modem processors, video processors, etc.), memory blocks (e.g., read only memory (ROM), random access memory (RAM), flash, etc.), and resources (e.g., timers, voltage regulators, oscillators, etc.), any or all of which may be included in one or more cores.

Memory technologies described herein may be suitable for storing instructions, programs, control signals, and/or data for use in or by a computer or other digital electronic device. Any references to terminology and/or technical details related to an individual type of memory, interface, standard, or memory technology are for illustrative purposes only, and not intended to limit the scope of the claims to a particular memory system or technology unless specifically recited in the claim language. Mobile computing device architectures have grown in complexity, and now commonly include multiple processor cores, SoCs, co-processors, functional modules including dedicated processors (e.g., communication modem chips, GPS receivers, etc.), complex memory systems, intricate electrical interconnections (e.g., buses and/or fabrics), and numerous other resources that execute complex and power intensive software applications (e.g., video streaming applications, etc.).

Process technology employed to manufacture semiconductor devices, including IC devices is continually improving. Process technology includes the manufacturing methods used to make IC devices and defines transistor size, operating voltages and switching speeds. Features that are constituent elements of circuits in an IC device may be referred as technology nodes and/or process nodes. The terms technology node, process node, process technology may be used to characterize a specific semiconductor manufacturing process and corresponding design rules. Faster and more power-efficient technology nodes are being continuously developed through the use of smaller feature size to produce smaller transistors that enable the manufacture of higher-density ICs.

Certain aspects of the disclosure are applicable to serializer/deserializer (SERDES) circuits used to transmit and receive data over a serial communication link. SERDES circuits may be included in certain input/output (I/O) circuits. For example, SERDES circuits may be used in an IC device that provide an interface between core circuits and memory devices. Many mobile devices employ Synchronous Dynamic Random Access Memory (SDRAM), including Low-Power Double Data Rate (DDR) SDRAM, which may be referred to as low-power DDR SDRAM, LPDDR SDRAM or, in some instances, LPDDRx where x describes the technology generation of the LPDDR SDRAM. Later generations of LPDDR SDRAM designed to operate at higher operating frequencies.

FIG. 1 illustrates example components and interconnections in a system-on-chip (SoC) 100, including a memory interface/bus 126, that may be suitable for implementing certain aspects of the present disclosure. The SoC 100 may include a number of heterogeneous processors, such as a central processing unit (CPU) 102, a modem processor 104, a graphics processor 106, and an application processor 108. Each processor 102, 104, 106, 108, may include one or more cores, and each processor/core may perform operations independent of the other processors/cores. The processors 102, 104, 106, 108 may be organized in close proximity to one another (e.g., on a single substrate, die, integrated chip, etc.) so that the processors may operate at a much higher frequency/clock rate than would be possible if the signals were to travel off-chip. The proximity of the cores may also allow for the sharing of on-chip memory and resources (e.g., voltage rails), as well as for more coordinated cooperation between cores.

The SoC 100 may include system components and resources 110 for managing sensor data, analog-to-digital conversions, and/or wireless data transmissions, and for performing other specialized operations (e.g., decoding high-definition video, video processing, etc.). System components and resources 110 may also include components such as voltage regulators, oscillators, phase-locked loops (PLLs), peripheral bridges, data controllers, system controllers, access ports, timers, and/or other similar components used to support the processors and software clients running on the computing device. The system components and resources 110 may also include circuitry for interfacing with peripheral devices, such as cameras, electronic displays, wireless communication devices, external memory chips, etc.

The SoC 100 may further include a Universal Serial Bus (USB) or other serial bus controller 112, one or more memory controllers 114, and a centralized resource manager (CRM) 116. The SoC 100 may also include an input/output module (not illustrated) for communicating with resources external to the SoC, each of which may be shared by two or more of the internal SoC components.

The processors 102, 104, 106, 108 may be interconnected to the USB controller 112, the memory controller 114, system components and resources 110, CRM 116, and/or other system components via an interconnection/bus module 122, which may include an array of reconfigurable logic gates and/or implement a bus architecture. Communications may also be provided by advanced interconnects, such as high performance networks on chip (NoCs).

The interconnection/bus module 122 may include or provide a bus mastering system configured to grant SoC components (e.g., processors, peripherals, etc.) exclusive control of the bus (e.g., to transfer data in burst mode, block transfer mode, etc.) for a set duration, number of operations, number of bytes, etc. In some cases, the interconnection/bus module 122 may implement an arbitration scheme to prevent multiple master components from attempting to drive the bus simultaneously. The memory controller 114 may be a specialized hardware module configured to manage the flow of data to and from a memory 124 via the memory interface/bus 126.

The memory controller 114 may comprise one or more processors configured to perform read and write operations with the memory 124. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In certain aspects, the memory 124 may be part of the SoC 100.

Figure 2:
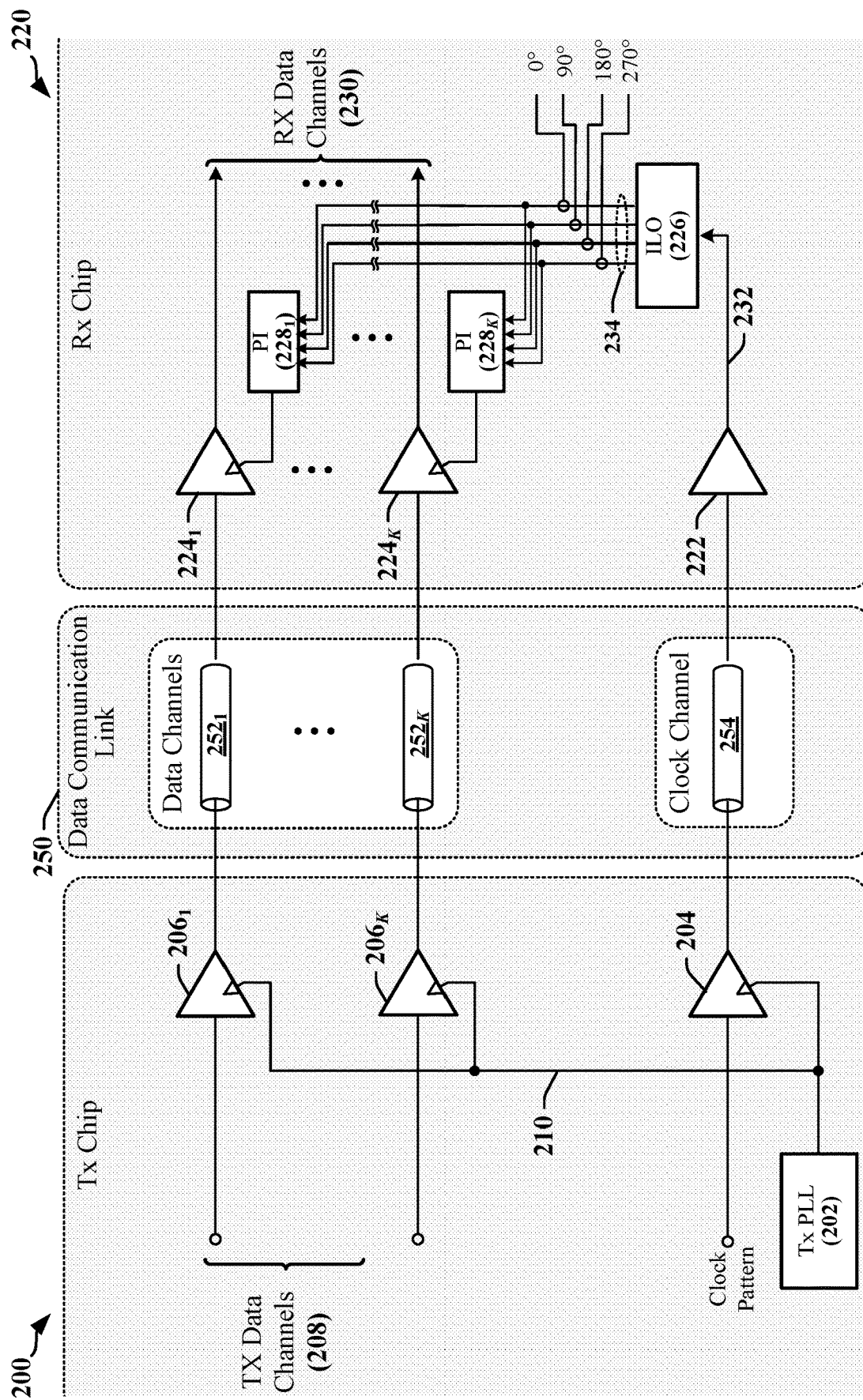
FIG. 2 illustrates an example of a system that employs a multi-channel data communication link.

FIG. 2 illustrates an example of a system that employs a multi-channel data communication link 250 to couple a transmitting device 200 with a receiving device 220. The data communication link 250 includes data channels $252_1$-$252_K$ that provide a transmission medium through which signals propagate from a first device to a second device. In the illustrated example, the transmitting device 200 can be configured to transmit data signals over one or more data channels $252_1$-$252_K$ in accordance with timing information provided by a clock signal transmitted over a clock channel 254. The transmitting device 200 may include serializers (not shown) configured to convert parallel data into serial data for transmission over the data channels $252_1$-$252_K$. The transmitting device 200 further includes data drivers $206_1$-$206_K$ configured to generate data signals over the one or more data channels $252_1$-$252_K$ to the receiving device 220 through the data communication link 250.

In some examples, the transmitting device 200 includes a clock driver 204 that generates the clock signal forwarded over the clock channel 254. In other examples, the clock channel 254 is omitted and the receiving device 220 is equipped with clock recovery circuits that can recover timing information from signals transmitted over one or more of the data channels $252_1$-$252_K$ in order to generate receive clock signals. Clock forwarding is common in communication systems, and provides the benefit that a phase locked loop (PLL) and other clock recovery circuits are not required in the receiving device 220. Typically, only one phase of the transmitter-generated clock signal is forwarded when clock forwarding is used. Limiting the number of clock signals can conserve power and the space that would be occupied by additional clock channels.

The receiving device 220 may be configured to receive and process the data signals. The receiving device 220 may generate additional phases of the received or recovered clock signal to obtain in-phase and quadrature (I/Q) versions of the clock signal to be used by phase interpolators $228_1$-$228_K$. A quadrature signal has phase that is shifted by 90° with respect to an in-phase signal. The phase interpolators $228_1$-$228_K$ may provide outputs that are phase-adjusted or phase-corrected I/Q versions of the clock signal. In one example, the outputs of each of the phase interpolators $228_1$-$228_K$ are provided to sampling circuits $224_1$-$224_K$.

Clock generation circuits in the receiving device 220 may include oscillators, which are fundamental building blocks of modern electronics. Oscillators are often implemented as ring oscillators (ROs), which can offer advantages over other types of oscillator including reduced area footprint, power efficiency and scalability with technological process. In the illustrated example, the clock generation circuits in the receiving device 220 includes an injection-locked oscillator (ILO 226) that receives a clock signal 232 from a line receiver 222 coupled to the clock channel 254 and generates phase-shifted versions 234 of the clock signal 232, including I/Q versions of the clock signal 232.

In high-speed applications, data throughput of a serial data link may be limited by the characteristics of the channel used to carry data signals. Impedance mismatches, parasitic coupling and other factors can cause signal distortion. In many implementations, equalization circuits and capabilities are included in input/output (I/O) circuits to compensate for signal distortions attributable to inter-symbol interference (ISI), reflection and other effects that can combine to limit bandwidth in a channel. ISI can result when a first-received symbol interferes with subsequently received symbols due to reflections, frequency-dependent delays and other imperfections in the channel. A symbol may refer to signaling state within a unit interval (UI), or symbol interval, in which data is modulated or encoded in the waveform of a transmitted signal.

Figure 3:
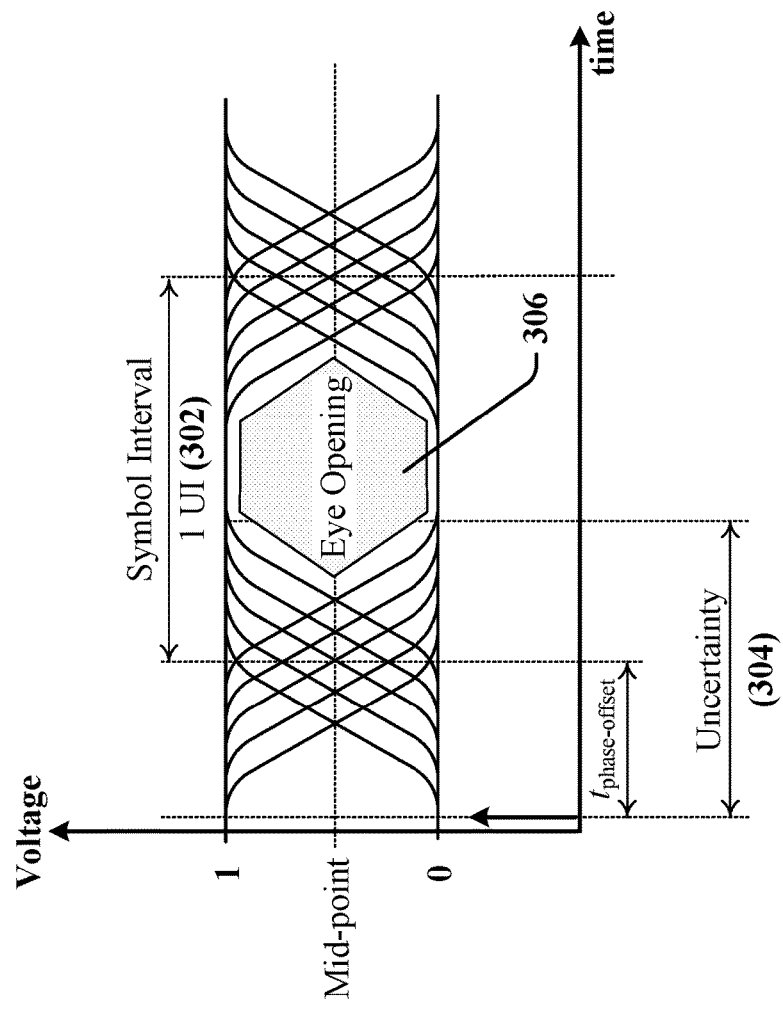
FIG. 3 illustrates transition regions and eye regions in an eye-pattern.

FIG. 3 illustrates an eye diagram 300 generated as an overlay of multiple symbol intervals, including a single symbol interval 302. The eye diagram 300 illustrates transmissions in which timing of transitions between symbol values varies over a number of symbol intervals 302. In many instances, signaling levels vary during transitions. A signal transition region 304 represents a time period of uncertainty at the boundary between two symbols where variable signal rise times prevent reliable decoding. State information may be determined reliably in a region defined by an eye opening 306 that represents the time period in which the symbol is stable and can be reliably received and decoded. The eye opening 306 may define a region in which mid-point crossings do not occur and a receiver or decoder can reliably sample, demodulate or decode information from a data signal in the symbol interval 302. The eye opening 306 may be narrowed along the time axis by increases in data rate and may be compressed in the voltage axis by ISI and other types of interference and distortion. A SERDES-based communication system may use an eye opening 306 in an eye diagram 300 as a basis for judging the ability of a receiver to reliably recover data from signals transmitted over a channel that is affected by substantial noise and ISI. The channel may include a serial transmission line.

Equalizers are commonly used in transmitters that drive serial links, including SERDES-based links. Transmitter-based equalizers aim to flatten the frequency response of the channel and reduce time-domain ISI at the receiver by pre-emphasis or de-emphasis performed at the transmitter. An equalizer circuit in the transmitter may be configured to boost the power of certain frequencies in a signal to be transmitted in order to counteract attenuation and interference that can affect the signal during transmission through the channel. In some instances, a transmitter-based equalizer used for a signal may be configured to boost the higher frequencies in the signal to improve edge transition at the receiver.

Figure 4:
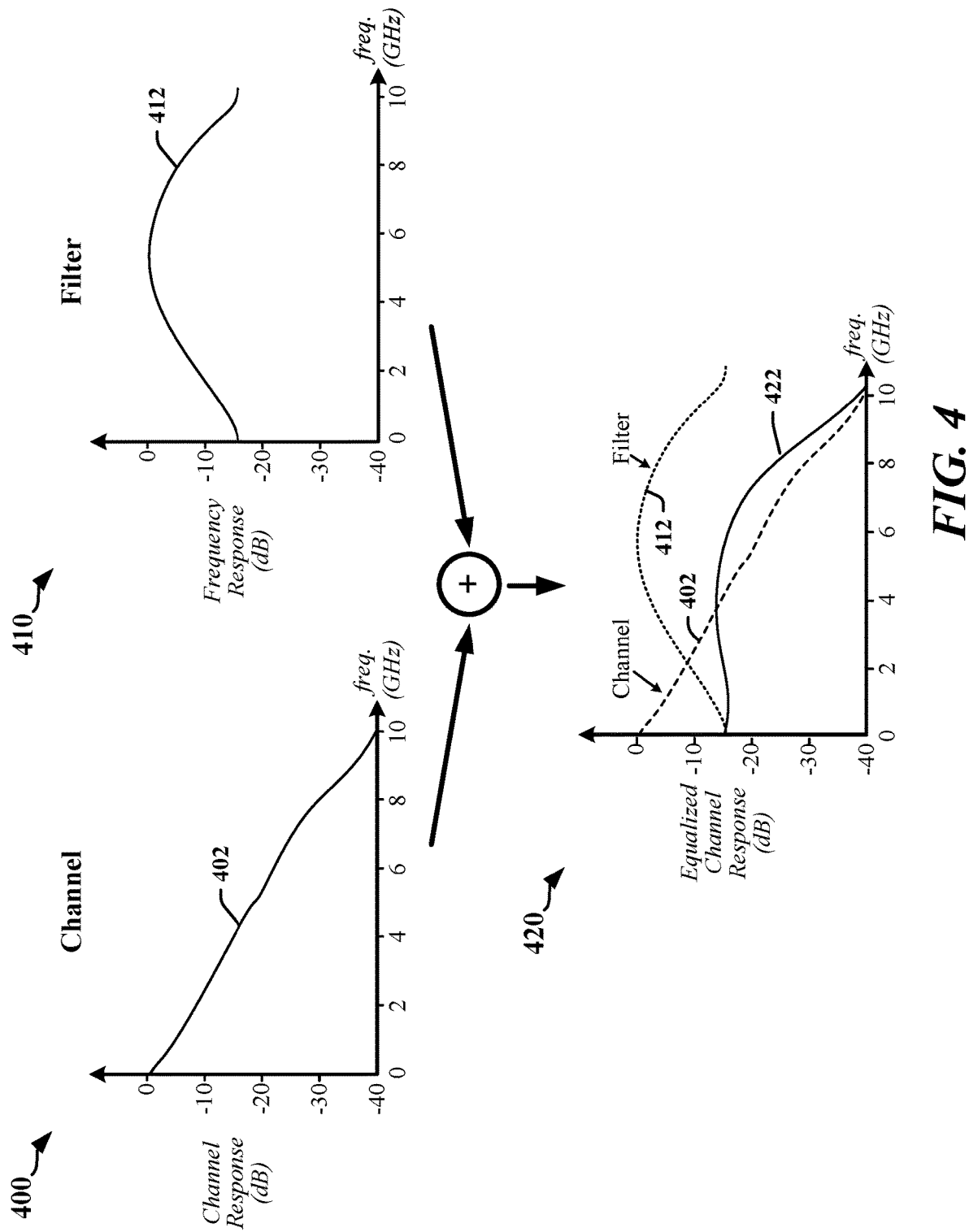
FIG. 4 illustrates certain aspects of the operation of a transmitter-based equalizer.

FIG. 4 illustrates certain aspects of the operation of a transmitter-based equalizer. A channel response diagram 400 illustrates the frequency response 402 of the channel. As shown in the channel response diagram 400, higher frequencies in a signal transmitted through the channel are attenuated more than lower frequencies. A frequency response diagram 410 illustrates the frequency response 412 of a filter that may be used for shaping de-emphasis in a transmitter. The filter may be configured to attenuate different frequencies by different amounts. The filter produces a signal that counteracts the effects of frequency-dependent variations in attenuation evident in the frequency response 402 of a channel. The equalized channel response diagram 420 illustrates the frequency response 422 of the equalized channel as observed at the receiver. The equalized channel response diagram 420 may be approximated by superimposing the frequency response 402 of the channel on the frequency response 412 of the filter used to shape the data signal. The resultant frequency response 422 of the equalized channel is flattened over a targeted range of frequencies.

Figure 5:
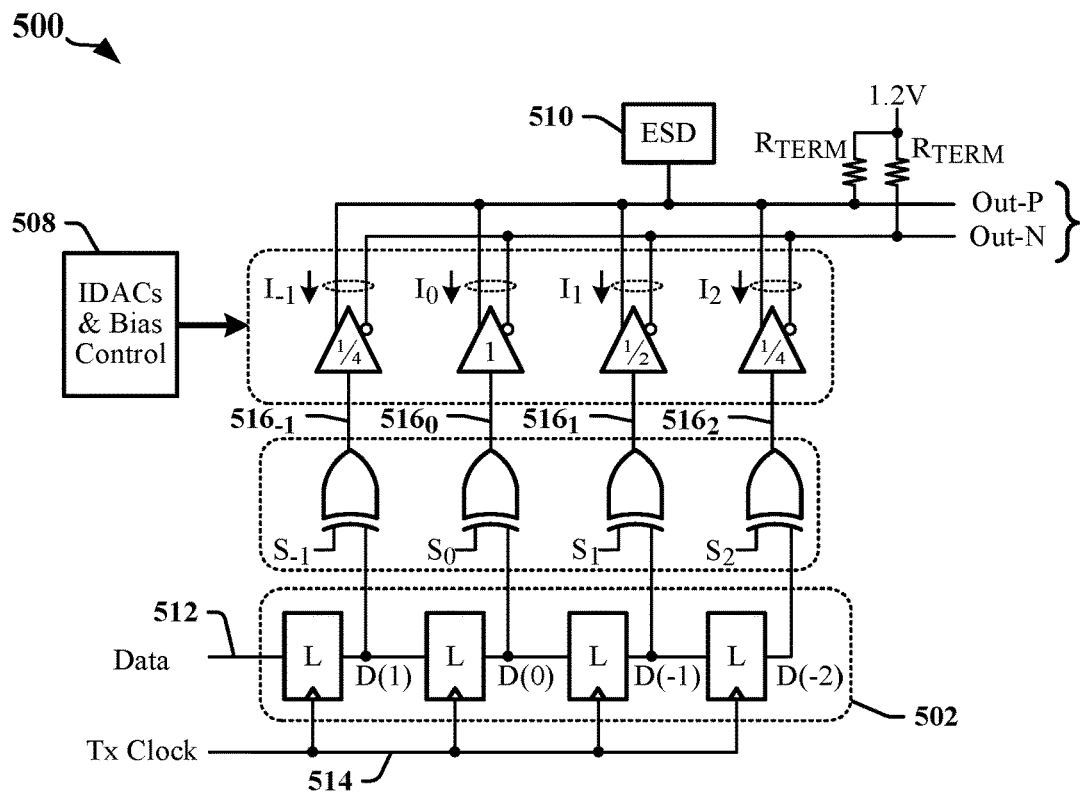
FIG. 5 illustrates a transmitter-based equalizer that employs a finite impulse response filter and/or T-coils.
Figure 5:
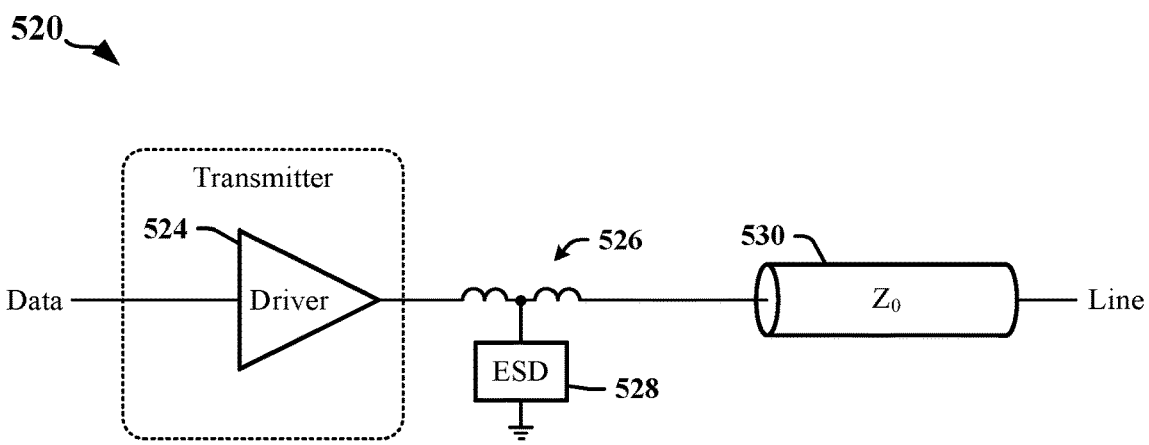

FIG. 5 illustrates a transmitter-based equalizer 500 that employs a finite impulse response (FIR) filter. A streamlined FIR filter is illustrated. A data signal 512 is provided to a delay line 502 that is clocked by the transmission clock 514 used to control transmission through a channel. The delay line 502 maintains the values of previously transmitted symbols $516_1$ and $516_2$ and provides the value of the symbol $516_0$ being transmitted and the next symbol $516_{-1}$ to be transmitted. A weight is applied to each symbol $516_0$, $516_1$, $516_2$ and $516_{-1}$. In the illustrated example, gain having a nominal unit weight (1×W) is applied to the symbol $516_0$ being transmitted, and gain having fractional weights (e.g., ¼ W, ½ W, etc.) are applied to the other symbols $516_1$, $516_2$ and $516_{-1}$. The applied weights may have a magnitude and sign. A controller may determine the value of the weights based on preconfigured information or information obtained from calibration or feedback. In the illustrated example, the weights are applied to control current levels and a current digital-to-analog converter (IDAC & bias control circuit 508) may receive weighting values from the controller. The transmitter-based equalizer 500 may include an electrostatic discharge (ESD) protection circuit 510.

The voltage ($V_{out}$) at the output of the transmitter-based equalizer 500 may be calculated as:

$$V_{out} = (I_{-1}D(1) + I_0 D(0) + I_1 D(-1) + I_2 D(-2)) \times \left(\frac{R_{TERM}}{2}\right).$$

FIR-based equalization schemes pre-distort pulses to be transmitted in order to counteract channel distortion, but at the cost of an attenuated transmitted signal. In effect, the FIR-based equalization schemes de-emphasize certain frequencies with respect to other frequencies. The FIR-based equalization schemes require extended clock distribution to the transmitter circuits that can add considerable overhead in power consumption and area needed on an IC to lay out the FIR equalizers, particularly for a heavily parallel interface. FIR-based equalization schemes require precise timing in order to generate different taps of the data signal 512, to avoid bit-errors and to control jitter. The tighter timing constraints can limit the design and capabilities of pre-driver circuits and impede driver segmentation. FIR-based equalization schemes are relatively ineffective in removing reflections in the channel.

FIG. 5 illustrates the use of T-coils 526 in a transmitter-based equalizer 520. A T-coil 526 may be used to couple the output of a driver circuit 524 to the transmission line of a channel 530. The driver circuit 524 may include equalization circuits. The T-coil 526 can extend the bandwidth of system and improve return-loss by nulling out some of the pad capacitance at the I/O pad used to couple the transmitter to the transmission line of the channel 530. Some of the pad capacitance may be attributable to circuits coupled to the I/O pad, or located proximate to the I/O pad, including ESD protection circuits 528 for example. T-coils 526 are associated with certain disadvantages including their occupation of large areas of an IC, which may be unacceptable in many DDR applications, for example. The inductive properties of the T-coils 526 may introduce integration challenges and restrict the types of circuits that can be collocated with the T-coils 526, including decap and power grid circuits.

Figure 6:
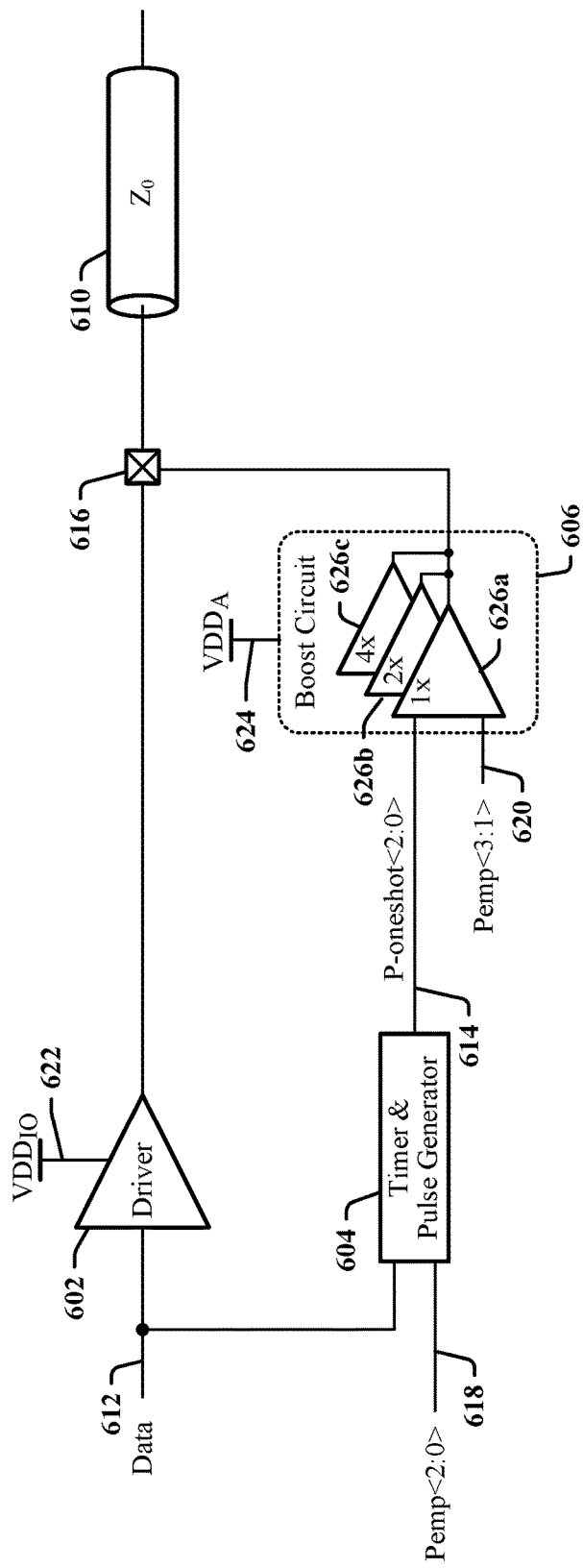
FIG. 6 illustrates elements of a timer-based, edge-boosting equalizer provided in accordance with certain aspects of this disclosure.

Certain aspects of this disclosure relate to the use of a timer-based, edge-boosting equalizer that can leverage a higher-voltage power supply than the power supply used by core circuits of the transmitter. FIG. 6 illustrates certain components of a timer-based, edge-boosting equalizer 600 provided in accordance with certain aspects of this disclosure. A line driver 602 drives the output pad 616 that may be coupled to a communication channel 610 in accordance with a data signal 612. The data signal 612 is coupled to a pulse generator circuit 604 that provides pulses 614 to helper circuits 626a, 626b, 626c in a boost circuit 606. A multibit enabling signal (the Pemp signal 620) is used to activate one or more of the helper circuits 626a, 626b, 626c. Each active helper circuit 626a, 626b, 626c drives the output pad 616 for a duration determined by a corresponding pulse 614 generated by the pulse generator circuit 604. The pulses are generally of short duration and triggered by rising edges in the data signal 612. In the illustrated example, the duration of each pulse is controlled using a 3-bit emphasis control signal (Pemp<2:0> 618). In other examples, fewer or more bits may be provided in Pemp<2:0> 618.

The output of the pulse generator circuit 604 is coupled to the helper circuits 626a, 626b, 626c in the boost circuit 606. In the illustrated example, three helper circuits 626a, 626b, 626c are provided and may be configured to contribute different magnitudes of current to output of the line driver 602, when activated and when the pulse is present at its input. The outputs of the helper circuits 626a, 626b, 626c may be binary-weighted. That is, a first helper circuit 626a contributes a unit of additional current when enabled, a second helper circuit 626b contributes two units of additional current when enabled and a third helper circuit 626c contributes four units of additional current when enabled. In this configuration, a 3-bit control code provided in the Pemp signal 620 can select a combined current contribution of between zero and seven units. The amperage in a unit of current may be defined by the configuration of the helper circuits 626a, 626b, 626c.

The instantaneous impedance of the transmitter to the supply rail is reduced when a helper circuit 626a, 626b, 626c is turned on. In the illustrated example, the instantaneous impedance between the transmitter and the I/O voltage power supply 622 may be reduced when the helper circuit 626a, 626b, 626c is turned on. The duration of the pulse may be configured to limit impedance reduction to periods of transition in the data signal 612. For example, boosting can be limited to edge information while static sections of the waveform (of the data signal 612) can be transmitted at nominal impedance to avoid or reduce any power penalty.

Certain transmitter circuits, including the line driver 602 may operate using a lower voltage power supply 622 than the power supply 624 coupled to the helper circuits 626a, 626b, 626c. In one example, helper circuits 626a, 626b, 626c are constructed using PMOS thick-oxide transistors that are configured to selectively pull the output pad 616 to the voltage of the higher voltage power supply 624 and to thereby increase the height of the eye opening in an eye diagram associated with the interface (cf. FIG. 3). The activation of one or more helper circuits 626a, 626b, 626c reduces the instantaneous impedance of the transmitter and can achieve a scalable boost at the rising edges in the data signal 612. The pulse generator circuit 604 may be configured to boost edge information through reduced impedance and to maintain nominal impedance during static sections of the waveform. P-type metal-oxide-semiconductor (PMOS) transistors may be used in some implementations. PMOS devices may be deployed to avoid additional increases in pin capacitance and when N-type metal-oxide-semiconductor (NMOS) devices, which switch to the same ground level as the line driver 602, would not provide sufficient gain or would degrade signal integrity due to increased pin capacitance.

Figure 7:
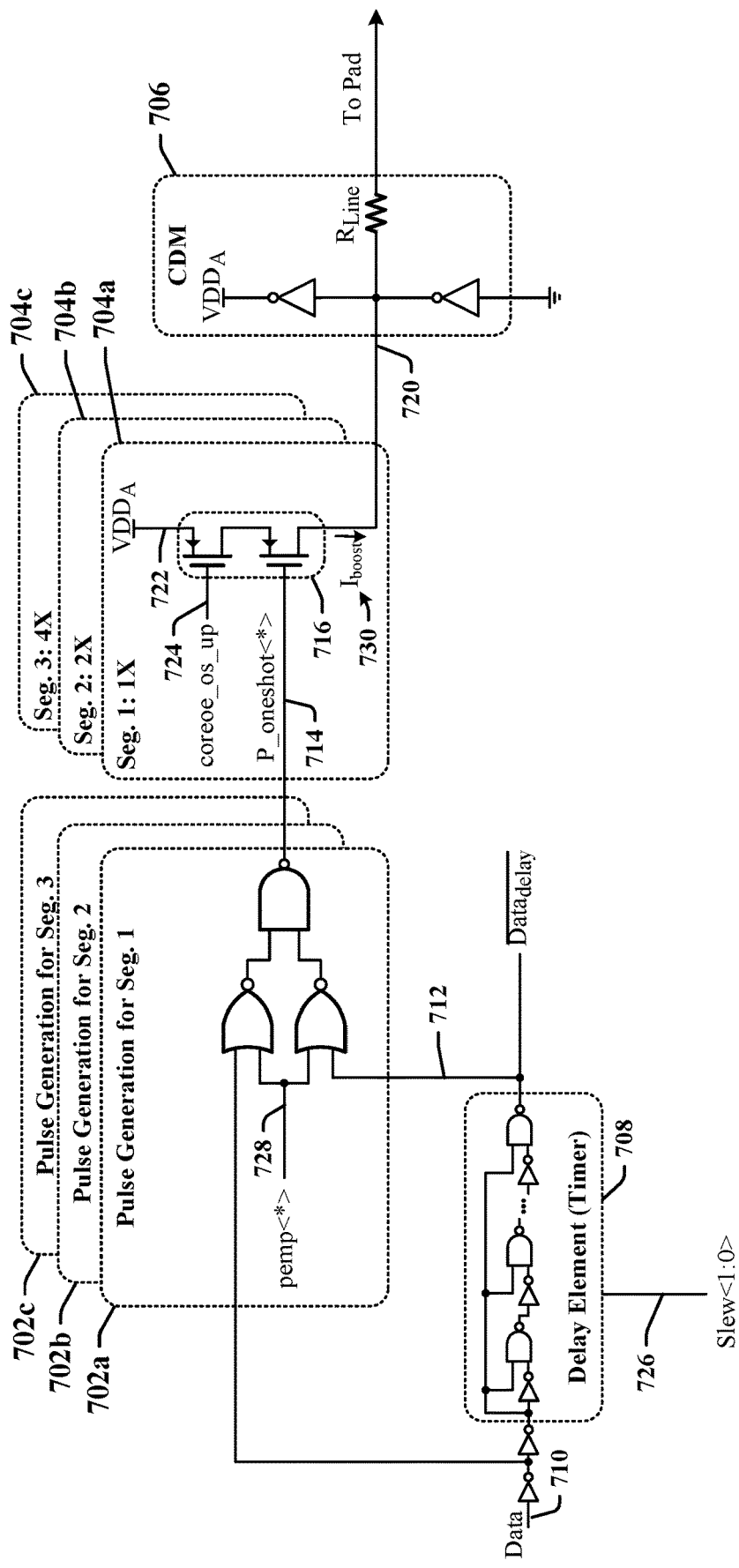
FIG. 7 illustrates one example of a timer-based, edge-boosting equalizing circuit implemented using PMOS-based helper circuits in accordance with certain aspects of this disclosure.

FIG. 7 illustrates one example of a timer-based, edge-boosting equalizing circuit 700 implemented using PMOS-based helper circuits 704a, 704b, 704c in accordance with certain aspects of this disclosure. The equalizing circuit 700 may be provided in a transmitter coupled to and configured to drive a serial transmission line. The illustrated equalizing circuit 700 can be configured to maximize equalizing gain at worst-case operating conditions, which may be associated with the effects of process, voltage and temperature (PVT) variances. These worst-case operating conditions may be associated with PVT corners and may correspond to conditions when equalization is most needed. PVT corners may be correlated with minimums of eye-opening. Conventional equalization schemes provide limited eye-opening enhancement and the increased power consumption and increased physical size of conventional transmitter-based equalizers tends to be prohibitive.

In one aspect of this disclosure, thick-oxide devices may be used in the timer-based, edge-boosting equalizing circuit 700. A thick-oxide transistor, for example, may be provided with a gate oxide thickness that is more than double the gate oxide thickness of a thin-oxide transistor. Thin oxide transistors may be used to achieve high-density, low-power circuits and thick oxide transistors may be used when higher voltage operation is desired. The gate oxide thickness of transistors may vary based on the manufacturing process. In one example, the nominal gate oxide thickness of a thick-oxide transistor may be 7 nm when the nominal gate oxide thickness of a thin-oxide transistor may be 3 nm. In the illustrated example, the equalizing circuit 700 includes thick-oxide PMOS transistors 716 coupled to a power supply (through the $VDD_A$ rail 722) that has a higher voltage that the power supply associated with the core transmitter circuit. In this example, the core transmitter circuit may include drivers and timing circuits that use some NMOS transistors, CMOS transistors or a combination of NMOS and CMOS transistors to drive the serial data link. The core transmitter circuit may include the line driver 602 and pulse generator circuit 604 illustrated in FIG. 6, for example. The configuration of the PMOS transistors 716 and the coupling to the $VDD_A$ rail 722 can limit edge boosting to rising edges in the data signal 710. In some implementations, the timer-based, edge-boosting equalizing circuit 700 can be adapted or configured to perform edge boosting for both rising edges and falling edges. In some examples, the timer-based, edge-boosting equalizing circuit 700 may be adapted or configured using NMOS thick-oxide devices or some combination of NMOS and PMOS devices.

The equalizing circuit 700 includes three segments that provide edge boosting. Each segment includes a pulse generation circuit 702a, 702b, 702c and a line driving, helper circuit 704a, 704b, 704c. In the illustrated example, each helper circuit 704a, 704b, 704c includes PMOS transistors 716 and is enabled by an output enable signal 724. In some instances, each output enable signal 724 is controlled based on the value of an associated bit in a multibit enabling signal such as the Pemp signal 620 illustrated in FIG. 6. The first line helper circuit 704a, for example, responds to a pulse in a one-shot signal 714 by pulling the equalizer output 720 to the $VDD_A$ rail 722, when enabled by the output enable signal 724. The one-shot signal 714 is received from a corresponding pulse generation circuit 702a and the duration of the pulse in the one-shot signal 714 controls the duration of the boost provided to the equalizer output 720. In the illustrated example, the duration of the pulse is obtained by comparing the input data signal 710 with the $Data_{delay}$ signal 712, which is a delayed version of the input data signal 710 and providing a pulse that is in a low (active) signaling state when a difference in signaling state exists between the input data signal 710 and the $Data_{delay}$ signal 712.

The impedance presented to the serial transmission line is reduced when a helper circuit 704a, 704b, 704c in the equalizing circuit 700 is actively driving the equalizer output 720. The reduction in impedance can reduce the effect of reflections during the rise time of the signal driven by the transmitter and can help enlarge the eye-opening at the receiver.

A pre-emphasis control signal 728 can be used to selectively enable and disable the pulse generation circuit 702a. In one example, the pre-emphasis control signal 728 can be used to suppress generation of pulses in response to a request from an application processor in order to manage power budgets.

In some examples, the $Data_{delay}$ signal 712 is generated using a configurable delay element 708. In the illustrated example, the delay can be configured based on the value of a slew control signal 726. The slew control signal 726 may be a multi-bit signal configurable to adjust the width of generated pulses and to control the amount of boost applied at edges in the data signal 710. In the example illustrated in FIG. 7, the slew control signal 726 is a 2-bit signal (slew<1:0>). In other implementations, the slew control signal may have a different number of bits. In some examples, the slew control signal 726 may be provided by a controller, state machine or other processing device that can dynamically reconfigure the delay element 708 based on target bit rate, indications of changes in channel conditions, feedback from the receiver or requests from an application. In some examples, the slew control signal 726 may be preconfigured during design, manufacture or system integration.

Figure 8:
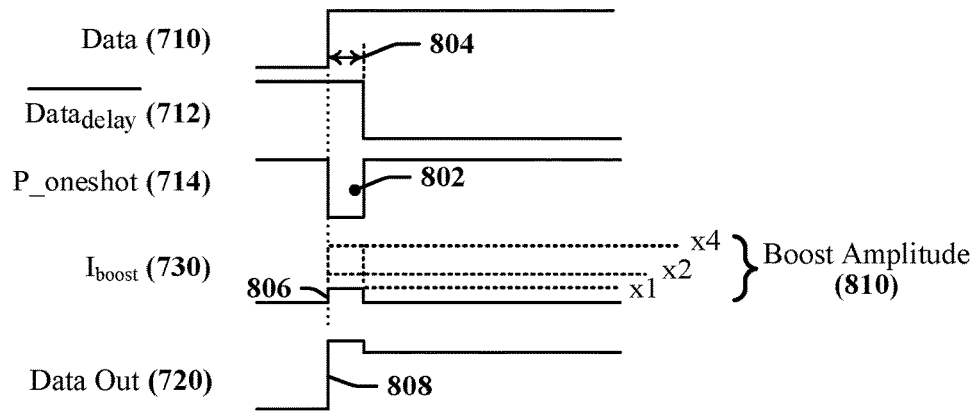
FIG. 8 illustrates certain aspects of the timing associated with the edge-boosting equalizing circuit illustrated in FIG. 7.
Figure 8:
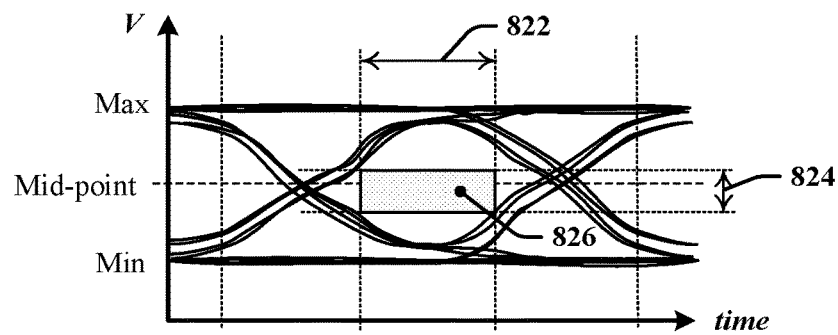
Figure 8:
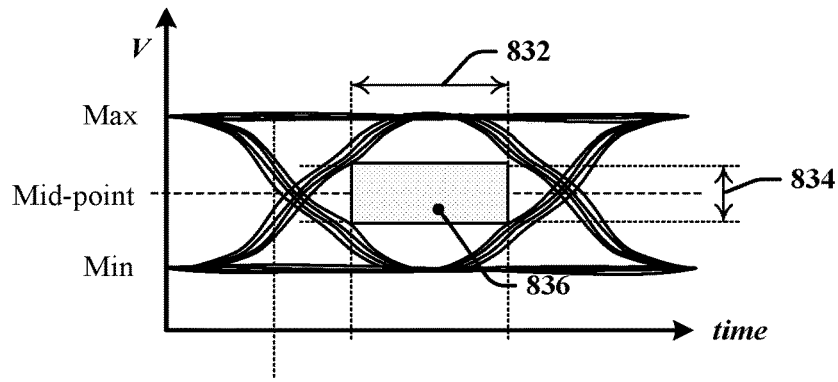

FIG. 8 illustrates certain aspects of the timing 800 associated with the edge-boosting equalizing circuit 700 illustrated in FIG. 7. The duration of a pulse 802 generated by the pulse generation circuit 702a is determined by the delay 804 between the input data signal 710 with the $Data_{delay}$ signal 712. The pulse 802 controls the timing of the boost 806 added to the input data signal 710 to obtain a boosted rising edge 808 on the serial transmission line. The boost amplitude 810, which represents the amplitude of an equalization voltage and/or equalization current (e.g., the current 730) added to the equalizer output 720, may be controlled using the multibit enabling signal (e.g., the Pemp signal 620 illustrated in FIG. 6) to selectively enable the helper circuits 704a, 704b, 704c.

FIG. 8 includes a first eye diagram 820 that corresponds to a data signal received from a channel with no edge-boosting at the transmitter and a second eye diagram 830 that corresponds to a data signal received from a channel with edge-boosting provided by the timer-based, edge-boosting equalizing circuit 700 illustrated in FIG. 7. The boost provided to the rising edges in signals transmitted over the serial transmission line can be configured to increase the height 834 of the eye opening 836 in the second eye diagram 830 with respect to the height 824 of the eye opening 826 in the first eye diagram 820. The boost provided to the rising edge in signals transmitted over the serial transmission line may also increase the width 832 of the eye opening 836 in the second eye diagram 830 with respect to the width 822 of the eye opening 826 in the first eye diagram 820. In the illustrate example, high frequency components of the signals in the second eye diagram 830 are amplified with respect to corresponding signals in the first eye diagram 820. In the first eye diagram 820, high frequency components do not reach maximum amplitude after a transition and before the next edge occurs.

According to certain aspects of the disclosure, each of the segments operates in the same manner. Each segment may be configured to provide a boost level that is different from the other segments, where the overall boost may be calculated as the sum of the boosts provided by each segment. The level of boost that can be provided by a segment may be determined by the current 730 sourced or sunk by the corresponding helper circuit 704a, 704b, 704c when the helper circuit 704a, 704b, 704c is enabled. In the illustrated example, the first helper circuit 704a contributes a unit of current when enabled, where the unit of current may correspond to the current sourced or sunk to provide minimum boost power to an edge in the signals transmitted over the serial transmission line. The second helper circuit 704b contributes two units of current when enabled, the third helper circuit 704c contributes four units of current when enabled. A 3-bit code ("the EQ code") can be provided as the output enable signals of the helper circuits 704a, 704b, 704c to select between zero and seven boost power levels. For example, the least significant bit of the EQ code can be coupled to the output enable signal 724 used to control the first helper circuit 704a.

The combination of the EQ code and the slew control signal 726 may be used to control the level of equalization provided by the timer-based, edge-boosting equalizing circuit 700. Table 1 illustrates an example of equalization power as a percentage of total power in a line driver circuit for different values of the EQ code.

TABLE 1

| EQ Code: | 0 | 1 | 2 | 3 | 4 | 5 | 6 | 7 |
|---|---|---|---|---|---|---|---|---|
| EQ Power (mW) | 0 | 0.92 | 1.33 | 1.81 | 2.01 | 2.35 | 2.60 | 2.93 |
| Total Power (Mw) | 4.92 | 5.73 | 6.05 | 6.43 | 6.54 | 6.88 | 7.08 | 7.36 |
| EQ Power (Percent) | 0.00 | 16.17 | 22.08 | 28.18 | 30.77 | 34.17 | 36.72 | 39.80 |

In the illustrated example, the equalizer output 720 is coupled to a dedicated charged device model (CDM) ESD protection circuit 706 that is coupled to the $VDD_A$ rail 722. IC devices often include ESD protection circuits that can protect interface circuits during different types of ESD events. IC device qualification processes may include testing the susceptibility of the IC device to ESD events based on a human-body model (HBM) or based on the CDM characterization of ESD events. The HBM is intended to characterize the susceptibility of devices to damage from ESD events of ±1 kVolt resulting from human touching of an electronic device. The CDM is intended to characterize the susceptibility of devices to damage from ESD events of ±250 Volts that relate to sudden discharges of energy accumulated in an IC chip or package through direct contact charging or field-induced charging. In some implementations, the equalizer output 720 is coupled to a common HBM ESD protection circuit.

In some implementations, pulses corresponding to negative transitions (falling edges) in the input data signal 710 are suppressed. In many examples, boosting of negative transitions is expected or can be shown to provide marginal improvements in eye openings. For example, the eye-opening at certain PVT corners may be degraded when negative transitions are boosted due to increased pin capacitance. In some examples, the highest gain at the worst-case PVT corners can be accomplished by limiting boosting to positive transitions (rising edges) in the input data signal 710. Worst-case PVT corners are associated with the smallest eye-openings and communication link can benefit most from equalization at these worst-case PVT corners.

In some implementations, the equalizing circuit 700 illustrated in FIG. 7 can produce effects similar to those obtained from the use of T-coils but without the T-Coil integration penalties such as inductive pulling, decap depopulation, increased area, increased routing complexity. For example, the equalizing circuit 700 can limit or remove reflections, improving on performance of conventional FIR-based equalizers. In general, the timer-based, edge-boosting equalizing circuit 700 can provide 10% or more improvements in performance at certain er schemes at target data rates with an average 9% improvement in eye-opening across PVT corners.

Figure 9:
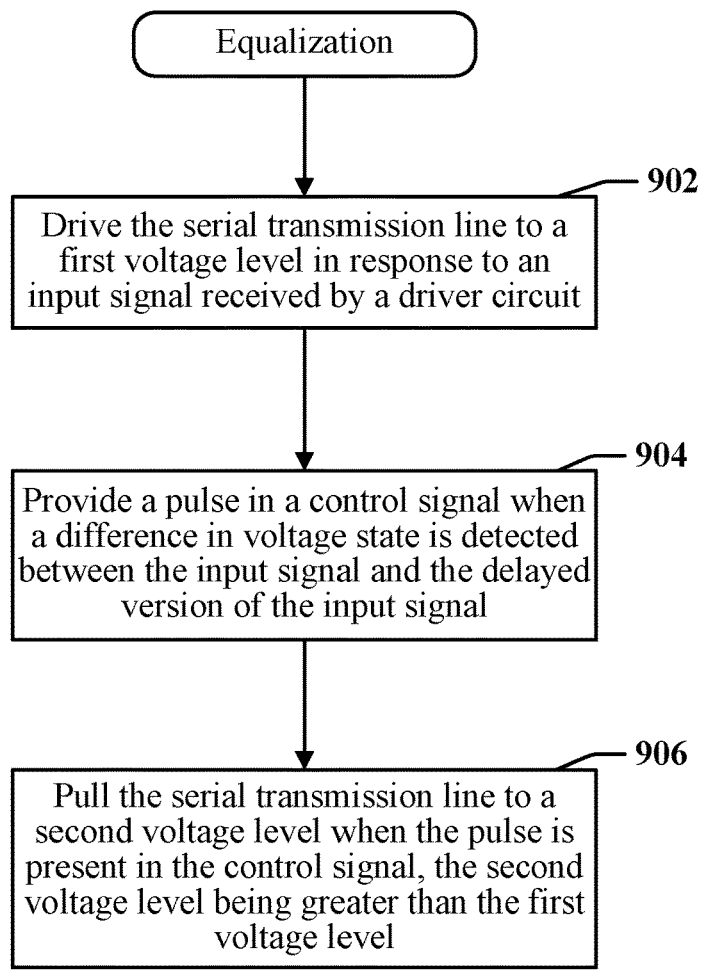
FIG. 9 is a flow diagram illustrating an example of a method 900 for equalizing a data signal transmitted over a serial transmission line in accordance with certain aspects disclosed herein.

FIG. 9 is a flow diagram illustrating an example of a method 900 for equalizing a data signal transmitted over a serial transmission line in accordance with certain aspects disclosed herein. The method 900 may be implemented in a transmitter coupled to the serial transmission line. At block 902, the transmitter may drive the serial transmission line to a first voltage level in response to an input signal received by a driver circuit. At block 904, the transmitter may provide a pulse in a control signal when a difference in voltage state is detected between the input signal and the delayed version of the input signal. At block 906, the transmitter may pull the serial transmission line to a second voltage level when the pulse is present in the control signal, the second voltage level being greater than the first voltage level.

In some examples, the transmitter may configure a delay circuit to apply a delay to the input signal. The transmitter may use an output of the delay circuit as the delayed version of the input signal. The transmitter may be configured to receive a multibit delay select signal and use the multibit delay select signal to select one of multiple configurable delays to generate the output of the delay circuit. The transmitter may present a reduced impedance to the serial transmission line when the pulse is present in the control signal.

In certain examples, the transmitter may source or sink an equalization current through the serial transmission line when the pulse is present in the control signal. The equalization current may have a level configured based on a value of an equalization code used to control one or more helper circuits. Each helper circuit may be configured to receive the control signal and to pull the serial transmission line to the second voltage level when the pulse is present in the control signal. Each helper circuit may be configured to receive the control signal and to pull the serial transmission line to the second voltage level when the pulse is present in the control signal. In some instances, the driver circuit is coupled to the serial transmission line using NMOS transistors, and the one or more helper circuits are coupled to the serial transmission line using PMOS transistors. The one or more helper circuits are coupled to the serial transmission line using thick-oxide PMOS transistors. In some instances, the driver circuit is coupled to the serial transmission line using a combination of NMOS transistors and PMOS transistors and the one or more helper circuits are coupled to the serial transmission line using thick-oxide PMOS transistors.

The operational steps described in any of the exemplary aspects herein are described to provide examples. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering. In certain aspects, an apparatus includes means for transmitting a data signal over a serial transmission line, including a driver circuit operated at a first voltage level and configured to drive the serial transmission line in accordance with an input signal; means for generating pulses, configured to provide a control signal representative of a voltage difference between the input signal with a delayed version of the input signal; and means for boosting the data signal including one or more helper circuits configured to pull the serial transmission line to a second voltage level when a pulse is present in the control signal, the second voltage level being greater than the first voltage level.

In some examples, the apparatus has a delay circuit configurable to provide the delayed version of the input signal by applying a delay to the input signal. The delay circuit may be configured to use a multibit delay select signal to select a delay to be applied to the input signal in order to provide the delayed version of the input signal.

In certain examples, each of the helper circuits reduces an impedance presented to the serial transmission line when the pulse is present in the control signal. The helper circuits may be configured to source or sink different levels of currents through the serial transmission line when the pulse is present in the control signal. Each helper circuit may have a gating circuit responsive to a corresponding enable signal that is indicative of a bit in an equalization code. A value of the equalization code may configure an amplitude of an equalization current that flows through the serial transmission line when the pulse is present in the control signal. The driver circuit may be coupled to the serial transmission line using NMOS transistors, and the one or more helper circuits may be coupled to the serial transmission line using PMOS transistors. In some instances, the one or more helper circuits are coupled to the serial transmission line using thick-oxide PMOS transistors. In some implementations, the driver circuit may be coupled to the serial transmission line using a combination of NMOS transistors and PMOS transistors, and wherein the one or more helper circuits are coupled to the serial transmission line using thick-oxide PMOS transistors.

Some implementation examples are described in the following numbered clauses:
1. An equalizing transmitter coupled to a serial transmission line comprising: a driver circuit coupled between an input signal and the serial transmission line, the driver circuit being configured to receive power at a first voltage level; one or more helper circuits, each helper circuit being configured to receive a control signal and to pull the serial transmission line to a second voltage level when a pulse is present in the control signal, the second voltage level being greater than the first voltage level; and one or more pulse generation circuits, each pulse generation circuit being configured to receive the input signal and a delayed version of the input signal and to provide the pulse in the control signal when a difference in voltage state is detected between the input signal and the delayed version of the input signal.
2. The equalizing transmitter as described in clause 1, further comprising: a delay circuit configurable to provide the delayed version of the input signal by applying a delay to the input signal.
3. The equalizing transmitter as described in clause 2, wherein the delay circuit is further configured to: receive a multibit delay select signal; and use the multibit delay select signal to select a delay to be applied to the input signal in order to provide the delayed version of the input signal.
4. The equalizing transmitter as described in any of clauses 1-3, wherein each of the one or more helper circuits reduces an impedance presented to the serial transmission line when the pulse is present in the control signal.
5. The equalizing transmitter as described in any of clauses 1-4, wherein the one or more helper circuits are configured to source or sink different levels of currents through the serial transmission line when the pulse is present in the control signal.
6. The equalizing transmitter as described in any of clauses 1-5, wherein each helper circuit comprises: a gating circuit responsive to a corresponding enable signal that is indicative of a bit in an equalization code, wherein the gating circuit enables its associated helper circuit to pull the serial transmission line to the second voltage level when turned on by the corresponding enable signal.
7. The equalizing transmitter as described in clause 6, wherein a value of the equalization code configures an amplitude of an equalization current that flows through the serial transmission line when the pulse is present in the control signal.
8. The equalizing transmitter as described in any of clauses 1-7, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.
9. The equalizing transmitter as described in clause 8, wherein the one or more helper circuits are coupled to the serial transmission line using thick-oxide PMOS transistors.
10. The equalizing transmitter as described in any of clauses 1-7, wherein the driver circuit is coupled to the serial transmission line using a combination of NMOS transistors and PMOS transistors, and wherein the one or more helper circuits are coupled to the serial transmission line using thick-oxide PMOS transistors.
11. An apparatus, comprising: means for transmitting a data signal over a serial transmission line, including a driver circuit operated at a first voltage level and configured to drive the serial transmission line in accordance with an input signal; means for generating pulses, configured to provide a control signal representative of a voltage difference between the input signal with a delayed version of the input signal; and means for boosting the data signal including one or more helper circuits configured to pull the serial transmission line to a second voltage level when a pulse is present in the control signal, the second voltage level being greater than the first voltage level.
12. The apparatus as described in clause 11, further comprising: a delay circuit configurable to provide the delayed version of the input signal by applying a delay to the input signal.
13. The apparatus as described in clause 12, wherein the delay circuit is configured to use a multibit delay select signal to select a delay to be applied to the input signal in order to provide the delayed version of the input signal.
14. The apparatus as described in any of clauses 11-13, wherein each of the one or more helper circuits reduces an impedance presented to the serial transmission line when the pulse is present in the control signal.
15. The apparatus as described in any of clauses 11-14, wherein the one or more helper circuits are configured to source or sink different levels of currents through the serial transmission line when the pulse is present in the control signal.
16. The apparatus as described in any of clauses 11-15, wherein each helper circuit comprises: a gating circuit responsive to a corresponding enable signal that is indicative of a bit in an equalization code.
17. The apparatus as described in clause 16, wherein a value of the equalization code configures an amplitude of an equalization current that flows through the serial transmission line when the pulse is present in the control signal.
18. The apparatus as described in any of clauses 11-17, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.
19. The apparatus as described in clause 18, wherein the one or more helper circuits are coupled to the serial transmission line using thick-oxide PMOS transistors.
20. The apparatus as described in any of clauses 11-17, wherein the driver circuit is coupled to the serial transmission line using a combination of NMOS transistors and PMOS transistors, and wherein the one or more helper circuits are coupled to the serial transmission line using thick-oxide PMOS transistors.
21. A method for equalizing a data signal transmitted over a serial transmission line, comprising: driving the serial transmission line to a first voltage level in response to an input signal received by a driver circuit; providing a pulse in a control signal when a difference in voltage state is detected between the input signal and the delayed version of the input signal; pulling the serial transmission line to a second voltage level when the pulse is present in the control signal, the second voltage level being greater than the first voltage level.
22. The method as described in clause 21, further comprising: configuring a delay circuit to apply a delay to the input signal, and using an output of the delay circuit as the delayed version of the input signal.
23. The method as described in clause 22, further comprising: receiving a multibit delay select signal; and using the multibit delay select signal to select a delay to be applied to the input signal in order to provide the delayed version of the input signal.

24. The method as described in any of clauses 21-23, further comprising: reducing an impedance presented to the serial transmission line when the pulse is present in the control signal.
25. The method as described in any of clauses 21-24, further comprising: sourcing or sinking an equalization current through the serial transmission line when the pulse is present in the control signal.
26. The method as described in clause 25, wherein the equalization current has a level configured based on a value of an equalization code used to control one or more helper circuits, wherein each helper circuit is configured to receive the control signal and to pull the serial transmission line to the second voltage level when the pulse is present in the control signal.
27. The method as described in clause 26, wherein each helper circuit is configured to receive the control signal and to pull the serial transmission line to the second voltage level when the pulse is present in the control signal.
28. The method as described in clause 26 or 27, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.
29. The method as described in clause 28, wherein the one or more helper circuits are coupled to the serial transmission line using thick-oxide PMOS transistors.
30. The method as described in clause 26 or 27, wherein the driver circuit is coupled to the serial transmission line using a combination of NMOS transistors and PMOS transistors, and wherein the one or more helper circuits are coupled to the serial transmission line using thick-oxide PMOS transistors.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The present disclosure is provided to enable any person skilled in the art to make or use aspects of the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An equalizing transmitter coupled to a serial transmission line comprising:
   a driver circuit coupled between an input signal and the serial transmission line, the driver circuit being configured to receive power at a first voltage level;
   one or more helper circuits, each helper circuit being configured to receive a control signal and to pull the serial transmission line to a second voltage level when each pulse in a plurality of pulses is present in the control signal, the second voltage level being greater than the first voltage level; and
   one or more pulse generation circuits, each pulse generation circuit being configured to receive the input signal and a delayed version of the input signal and to provide the plurality of pulses in the control signal when differences in voltage state is detected between the input signal and the delayed version of the input signal.
2. The equalizing transmitter of claim 1, further comprising:
   a delay circuit configurable to provide the delayed version of the input signal by applying a delay to the input signal.
3. The equalizing transmitter of claim 2, wherein the delay circuit is further configured to:
   receive a multibit delay select signal; and
   use the multibit delay select signal to select a delay to be applied to the input signal in order to provide the delayed version of the input signal.
4. The equalizing transmitter of claim 1, wherein each of the one or more helper circuits reduces an impedance presented to the serial transmission line when each pulse is present in the control signal.
5. The equalizing transmitter of claim 1, wherein the one or more helper circuits are configured to source or sink different levels of currents through the serial transmission line when each pulse is present in the control signal.
6. The equalizing transmitter of claim 1, wherein each helper circuit comprises:
   a gating circuit responsive to a corresponding enable signal that is indicative of a bit in an equalization code, wherein the gating circuit enables its associated helper circuit to pull the serial transmission line to the second voltage level when turned on by the corresponding enable signal.
7. The equalizing transmitter of claim 6, wherein a value of the equalization code configures an amplitude of an equalization current that flows through the serial transmission line when each pulse is present in the control signal.
8. The equalizing transmitter of claim 1, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.
9. The equalizing transmitter of claim 8, wherein the one or more helper circuits are coupled to the serial transmission line using thick-oxide PMOS transistors.
10. The equalizing transmitter of claim 1, wherein the driver circuit is coupled to the serial transmission line using a combination of NMOS transistors and PMOS transistors, and wherein the one or more helper circuits are coupled to the serial transmission line using thick-oxide PMOS transistors.
11. An apparatus comprising:
   means for transmitting a data signal over a serial transmission line, including a driver circuit operated at a first voltage level and configured to drive the serial transmission line in accordance with an input signal;
   means for generating pulses, configured to provide a plurality of pulses in a control signal when differences in voltage state are detected between the input signal with a delayed version of the input signal; and
   means for boosting the data signal including one or more helper circuits configured to pull the serial transmission line to a second voltage level when each pulse in the plurality of pulses is present in the control signal, the second voltage level being greater than the first voltage level.

12. The apparatus of claim 11, further comprising:
a delay circuit configurable to provide the delayed version of the input signal by applying a delay to the input signal.

13. The apparatus of claim 12, wherein the delay circuit is configured to use a multibit delay select signal to select a delay to be applied to the input signal in order to provide the delayed version of the input signal.

14. The apparatus of claim 11, wherein each of the one or more helper circuits reduces an impedance presented to the serial transmission line when each pulse is present in the control signal.

15. The apparatus of claim 11, wherein the one or more helper circuits are configured to source or sink different levels of currents through the serial transmission line when each pulse is present in the control signal.

16. The apparatus of claim 11, wherein each helper circuit comprises:
a gating circuit responsive to a corresponding enable signal that is indicative of a bit in an equalization code.

17. The apparatus of claim 16, wherein a value of the equalization code configures an amplitude of an equalization current that flows through the serial transmission line when each pulse is present in the control signal.

18. The apparatus of claim 11, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.

19. The apparatus of claim 18, wherein the one or more helper circuits are coupled to the serial transmission line using thick-oxide PMOS transistors.

20. The apparatus of claim 11, wherein the driver circuit is coupled to the serial transmission line using a combination of NMOS transistors and PMOS transistors, and wherein the one or more helper circuits are coupled to the serial transmission line using thick-oxide PMOS transistors.

21. A method for equalizing a data signal transmitted over a serial transmission line comprising:
driving the serial transmission line to a first voltage level in response to an input signal received by a driver circuit;
providing a plurality of pulses in a control signal when differences in voltage state are detected between the input signal and a delayed version of the input signal; and
pulling the serial transmission line to a second voltage level when each pulse in the plurality of pulses is present in the control signal, the second voltage level being greater than the first voltage level.

22. The method of claim 21, further comprising:
configuring a delay circuit to apply a delay to the input signal; and
using an output of the delay circuit as the delayed version of the input signal.

23. The method of claim 22, further comprising:
receiving a multibit delay select signal; and
using the multibit delay select signal to select one of multiple configurable delays to generate the output of the delay circuit.

24. The method of claim 21, further comprising:
reducing an impedance presented to the serial transmission line when each pulse is present in the control signal.

25. The method of claim 21, further comprising:
sourcing or sinking an equalization current through the serial transmission line when each pulse is present in the control signal.

26. The method of claim 25, wherein the equalization current has a level configured based on a value of an equalization code used to control one or more helper circuits, wherein each helper circuit is configured to receive the control signal and to pull the serial transmission line to the second voltage level when each pulse is present in the control signal.

27. The method of claim 26, wherein each helper circuit is configured to receive the control signal and to pull the serial transmission line to the second voltage level when each pulse is present in the control signal.

28. The method of claim 26, wherein the driver circuit is coupled to the serial transmission line using N-type metal-oxide-semiconductor (NMOS) transistors, and wherein the one or more helper circuits are coupled to the serial transmission line using P-type metal-oxide-semiconductor (PMOS) transistors.

29. The method of claim 28, wherein the one or more helper circuits are coupled to the serial transmission line using thick-oxide PMOS transistors.

30. The method of claim 26, wherein the driver circuit is coupled to the serial transmission line using a combination of NMOS transistors and PMOS transistors, and wherein the one or more helper circuits are coupled to the serial transmission line using thick-oxide PMOS transistors.

* * * * *